United States Patent [19]

Nose et al.

[11] Patent Number: 5,781,313
[45] Date of Patent: Jul. 14, 1998

[54] FLAT BED SCANNER

[75] Inventors: Yoshitaka Nose, Kyoto; Koji Yamamoto, Nagaokakyo, both of Japan

[73] Assignee: Murata Kikai Kabushkiki Kaishi, Kyoto, Japan

[21] Appl. No.: 757,506

[22] Filed: Nov. 27, 1996

[30] Foreign Application Priority Data

Nov. 29, 1995  [JP]  Japan ................... 7-310375

[51] Int. Cl.[6] .................................. H04N 1/04
[52] U.S. Cl. .......................... 358/497; 358/474
[58] Field of Search ...................... 358/497, 475, 358/443, 474, 509, 496, 494, 471, 400, 505, 412, 420; 355/69; 250/234–236, 208.1

[56] References Cited

U.S. PATENT DOCUMENTS

| | | | |
|---|---|---|---|
| 4,709,147 | 11/1987 | Arai | 358/494 |
| 4,959,737 | 9/1990 | Nakatani | 358/475 |
| 5,164,845 | 11/1992 | Takeuchi | 358/474 |
| 5,239,393 | 8/1993 | Takeuchi | 358/474 |
| 5,285,294 | 2/1994 | Takeuchi | 358/474 |
| 5,311,015 | 5/1994 | Takeuchi | 358/497 |

*Primary Examiner*—Edward L. Coles
*Assistant Examiner*—Cheukfan Lee
*Attorney, Agent, or Firm*—Armstrong, Westerman, Hattori, McLeland & Naughton

[57] ABSTRACT

An ordinary facsimile by itself cannot scan a thick material such as books and catalogs. In order to scan the entire book, for example, each page of the book should first be copied by a copy machine and these sheets are then loaded into the facsimile. The improved flat bed scanner is connected to the facsimile to eliminate the copying operation. The flat bed scanner scans any thick material by simply loading it on its scanning glass and the scanned data is transmitted to the facsimile. Since the flat bed scanner is attached to the facsimile, personal computer or the like, it should be compact in size and low in cost. To reduce the cost, an outer cover of the flat bed scanner is produced by simple sheet metal processing, and the rough corner portions resulting from such a simple processing are hidden by corner members attached thereto. Inside the outer cover, located are a power source, a main control board and a stationary optical part. A middle cover extends over these components. First scanning part and second scanning part are positioned above the middle cover inside the outer cover. A wire for connecting the power source with the main control board is inserted in two tubes so that it does interfere with the components in the outer cover and the wire can bend at a point between the two tubes.

7 Claims, 6 Drawing Sheets

FLAT BED SCANNER

BACKGROUND OF THE INVENTION

1. Technical Field

The present invention relates to a flat bed scanner which carries out the scanning of a document placed upon a horizontal platen glass of the scanner and is utilized as a scanner for a facsimile, personal computer, CAD or the like.

2. Background Art

On conventional facsimiles, the scanning operation is carried out by transporting a document in a fixed direction. In short, the optics inside the device are fixed and the document must be moved. Due to such structures relating to transport of the document, the document scannable by the facsimile is limited to a specific thickness. Accordingly, thick documents such as books, catalogs and licenses must first be copied by a copy machine and then these copies are used as the document for the scanner of the facsimile.

Accordingly, the connection and use with a facsimile or the like of a special scanning device that is capable of optically scanning thick documents loaded on its platen glass similar to general copy machines has been considered. Such a scanning device can also be utilized advantageously for personal computers and CAD.

However, the scanning device should have as compact design as possible since it is utilized for the facsimile, personal computer, CAD, etc. In addition, it should be manufactured with a low price. In order to reduce the price, manufacturing preciseness and accuracy may be sacrificed to a certain extent, but decent scanning accuracy must be guaranteed. Furthermore, the scanning device should be compact, but it must be insured that the optical scanning part of the scanning device does not contact other components optically and physically.

SUMMARY OF THE INVENTION

In order to solve the aforementioned problems, it is an aim of the present invention to propose a flat bed scanner having the following construction. Firstly, a main control board, a fixed optical part and a power source are all located on the bottom of an outer cover (i.e., housing) such that they are housed in the outer cover. The outer cover has an open top. A middle cover is provided above these components and optical scanning parts are provided above the middle cover inside the outer cover. Further, a horizontal glass plate is provided above the optical scanning parts for placement of the document and for closing of the top of the outer cover. The power source is connected to the main control board by a harness.

The outer cover may be produced from a sheet material by a pressing/folding process such that it has a plurality of rough corner portions. A plastic corner member may be attached to each corner portion of the outer cover.

A tube flexible at its approximate center may be provided and the harness may extend through the tube.

The tube may include two spaced rigid tubular segments so that a portion of the harness is exposed between the two tubular segments and the two tubular segments can bend at the exposed portion of the harness.

DETAILED DESCRIPTION OF THE PREFERRED EMBODIMENTS

A preferred embodiment of the present invention will be described with reference to the attached drawings.

The construction of the outer cover (or housing) of the flat bed scanner of the present invention will be described first.

Figure 2:
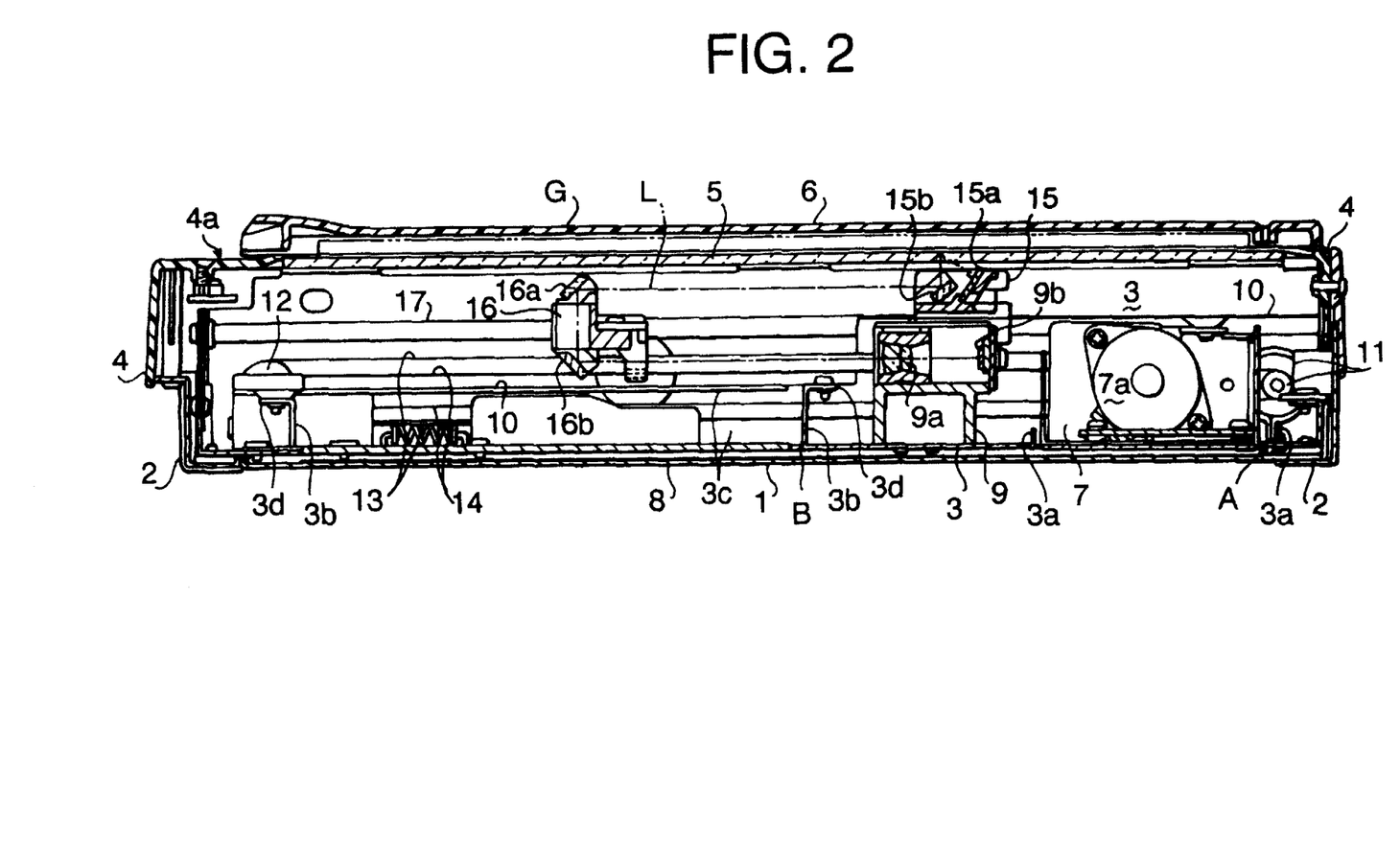
FIG. 2 is section view taken along the line X—X of FIG. 1.
Figure 5:
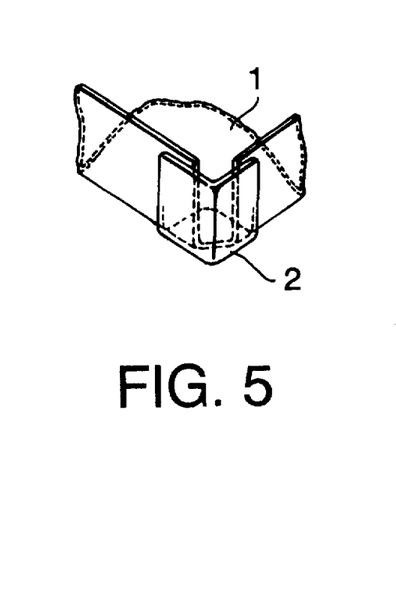
FIG. 5 is a partial perspective view showing attachment of a corner member to an outer cover of the flat bed scanner shown in FIG. 1.

Referring to FIGS. 2 and 5, the outer cover 1 is formed by pressing and/or folding a sheet metal with the side parts being formed by folding vertically upwards and the horizontal part being the base. The ends of a pair of adjacent side parts are connected by a plastic corner member 2 bent into an L-shaped when viewed from above. Aside from being a protective covering of each corner of the outer cover, this corner member 2 also functions as a leg of the flat bed scanner by projecting slightly below the lower surface of the outer cover 1. Also, as the corners can be safely constructed by the attachment of corner members 2, simply pressing/folding the sheet material is sufficient for preparation of the corner parts and there is no need for complicated processing such as that utilizing deep drawing thus contributing to the reduction in cost.

Figure 1:
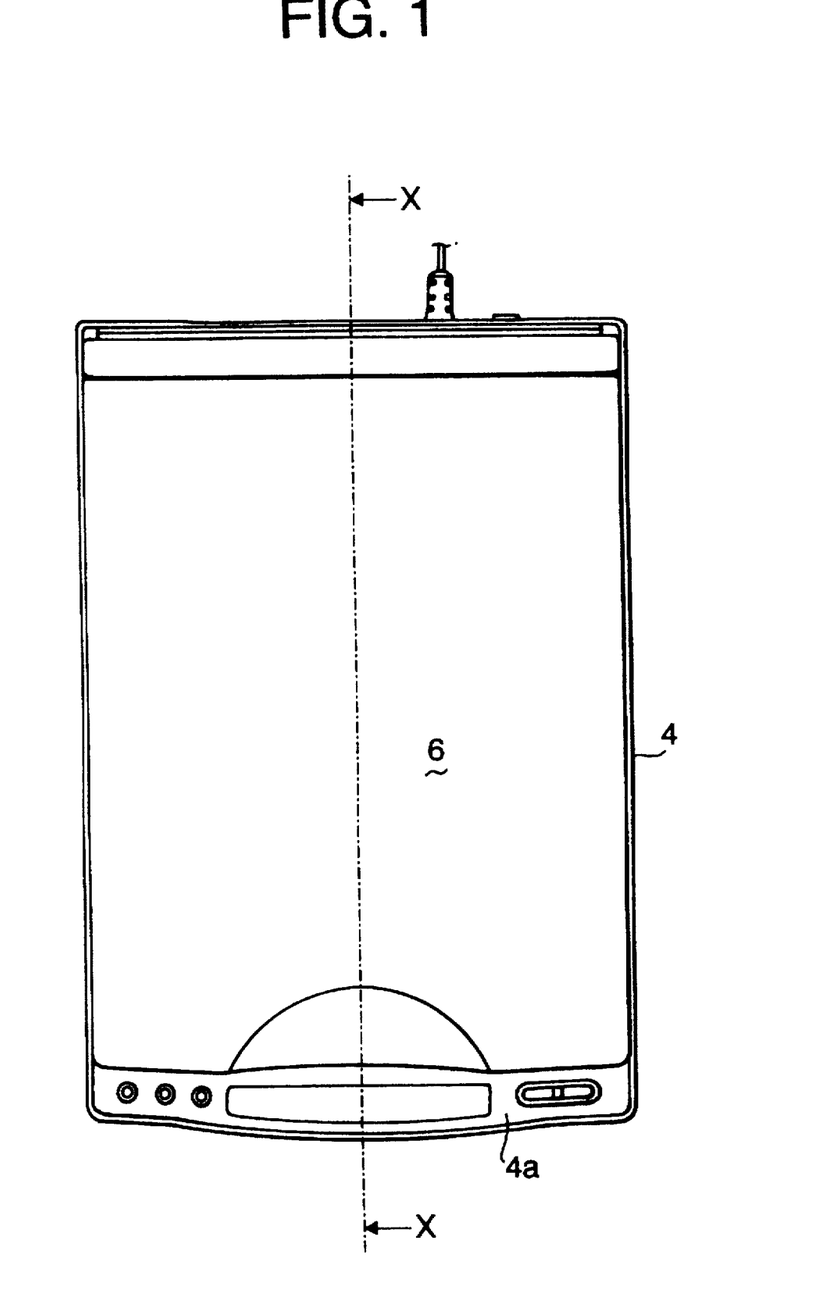
FIG. 1 is a plan view of a flat bed scanner of the present invention.

A chassis 3 being an inner cover is positioned inside the outer cover 1 as shown in FIG. 2 and a horizontal plastic document table cover 4 is positioned on the top side of the outer cover 1 and chassis 3. A flat plate platen glass 5 is fitted or embedded in the document table 4. Documents are put on the glass 5 when scanned. A resin document pressing cover 6 extends above the document table 4 and one end thereof (right end in FIG. 2) is pivotably attached to the document table 4 whereas the other end is freely placed on the document table 4. In FIG. 2, the cover 6 is able to pivot upward in the right direction about the right end at which it is attached to the document table 4. In FIG. 1, which is a top view of the scanning device, the cover 6 is connected to the document table 4 along its upper edge. It should be noted that an operating panel, a display and the like are arranged on that part 4a of the document table 4 which is not covered by the document press cover 6.

Next, the internal structure will be described with reference to FIGS. 2 through 4. As previously described, the chassis 3 is positioned inside the outer cover 1 as shown in the plan views of FIGS. 3 and 4. Rectangular cut-out areas A,B are formed in the base of the chassis 3 respectively so that the corresponding or overlapping portions of the base of the outer cover 1 are exposed. A power source 7 is fixed to the base of the outer cover 1 at the cut-out part A and the main control board 8 is fixed to the base of the outer cover 1 at the cut-out part B. When maintenance of the optics is needed, as the optical components and motor 7a which will be described later are mounted on the chassis 3, by simply separating the chassis 3 from the outer cover 1, the power source 7, the main base board 8 and the like can be removed separately from the optical components and motor and the like and maintenance can be carried out.

It should be noted that the peripheries of the openings A,B of the chassis 3 are bent vertically upward to form ribs 3a,3b,3c respectively. Specifically, the ribs 3a,3a (FIG. 3) are formed along the front and rear edges (upper and lower edges in the illustration) of the opening A. These ribs 3a, 3a function as positioning members for the power source 7. The ribs 3b,3b stand along the front and rear edges of the opening B and two screw plates or flanges 3d,3d extend from each rib 3b horizontally outward for fixing of the middle cover 10 by screws which will be described later. The ribs 3c, 3c are formed along the right and left edges of the opening B. As the main control board 8 is positioned in the cut-out area B, the ribs 3b,3b and ribs 3c,3c function in combination as an shield for the electric waves generated by the main control board 8. It should be noted that the upper edge or height of the ribs 3c,3c is higher than the top of the electronic components mounted on the main base board 8.

Figure 3:
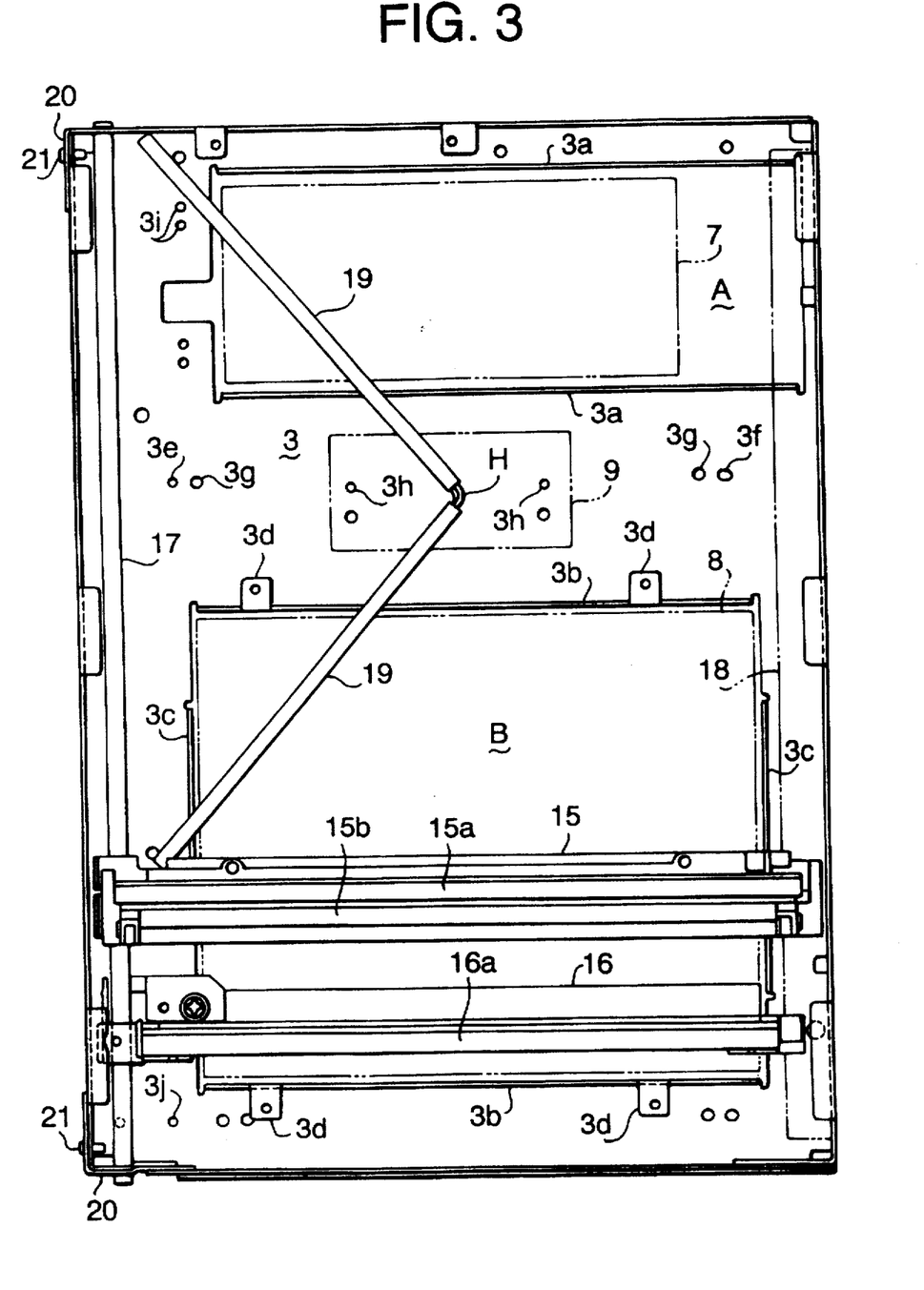
FIG. 3 is a plan view of a chassis of the flat bed scanner when optical scanning parts are in the scanning start positions respectively.

As shown in FIG. 3, screw holes 3g,3g and positioning holes 3e,3f for positioning the chassis 3 on the outer cover 1, which is below the chassis 3, are bored in the base plate of the chassis 3 between the cut-out areas A,B. As the diameter of screw hole 3g is slightly larger than the diameter of the screw, the positioning of the chassis 3 on the outer cover 1 is not determined simply by the screw holes 3g, 3g and the associated screws. Thus, a smaller round positioning hole 3e and another positioning hole 3f having the substantially same radius as the positioning hole 3e on the minor axis but elliptical in shape being extended to the left and right on the major axis are bored in the vicinity of those screw holes 3g,3g respectively. Conversely, projections which project upwards and which insert into the positioning holes 3e,3f are situated on the base surface of the outer cover 1. The reason for the lengthening of the positioning hole 3f is that in some cases the chassis 3 must be attached at an angle to the outer cover 1 when viewed from above in order to appropriately arrange the optical scanning parts and associated components. In short, the positioning of the optical scanning parts and associated components must be rigidly controlled and there must be a certain degree of freedom in positioning the chassis 3 so that positioning of the chassis 3 can be adjusted in accordance with the positioning of the optical scanning parts.

Screw holes 3h,3h for fixing the stationary optical part 9 which includes a lens 9a and CCD 9b (FIG. 2) are also bored in the based plate of the chassis 3 between the cut-out parts A,B, and the optical fixing part 9 is fixed to the same area. Furthermore, screw holes 3i,3i . . . are bored near one side (left side in FIG. 3) of the cut-out part A. These holes are used together with screws to support reduction gears that are connected to the motor shaft of the motor 7a (FIG. 2) and also to support the drive pulley 11 (FIG. 2) that is driven via the reduction gears. At a position opposite the drive pulley 11 in the front and back direction (width direction in FIG. 2) and near one side of the cut-out part B of the base surface of the chassis 3, screw holes 3j,3j . . . are bored to attach the free pulley 12 (FIG. 2).

Each of the drive pulley 11 and free pulley 12 comprises a large diameter pulley and a small diameter pulley being half the diameter and supported on the same axis. The large pulleys of the drive pulley 11 and free pulley 12, and the small diameter pulleys are of the same diameter respectively.

As understood from FIG. 2, a drive belt 13 is wound around the larger pulleys of the drive and free pulleys 11,12 and another drive belt 14 is wound around the smaller pulleys of the drive and free pulleys 11, 12. These drive belts 13, 14 are utilized to drive the optical scanning parts to be described later. The drive belt 13 is driven at twice the speed of the drive belt 14.

Figure 6:
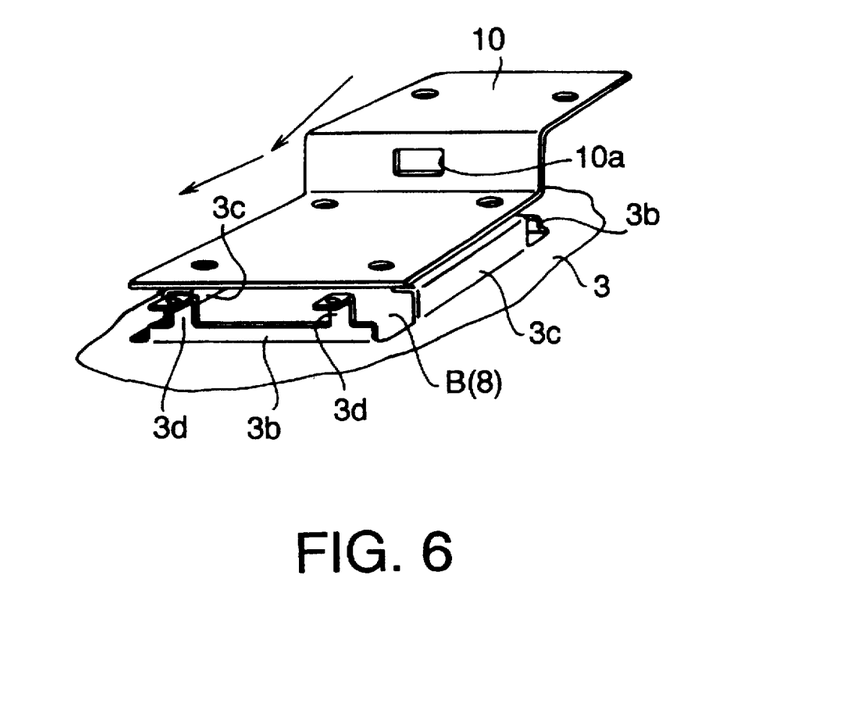
FIG. 6 is a perspective view showing the shape of a middle cover and the method of attachment.

In this way, apart from the drive mechanism (the belts between the drive pulley 11 and free pulley 12 and their drive units positioned on the base plate of the chassis 3), the power source 7 and main control board 8 positioned on the base plate of the outer cover 1 and the stationary optical part 9 positioned on the base plate of the chassis 3 are covered by the middle cover 10 from above. As shown in FIGS. 2 and 6, the middle cover 10 has a stepwise configuration comprising lower and upper levels. As illustrated in FIG. 2, the upper level is positioned over the top of the power source 7 and fixed optical part 9 and is screwed to the power source 7, and the lower level extends over (or covers) the main control board 8 and is screwed to the flanges 3d,3d of the ribs 3b,3b. It should be noted that when the lower level is being positioned over the main control board 8, by inserting the middle cover 10 into the chassis 3 in the direction as indicated by the arrows shown in FIG. 6, the ribs 3c,3c formed in the insertion direction of the middle cover 10 slidably guide the lower part of the middle cover 10 so that the middle cover 10 does not contact the electrical components attached to the main control board 8 below thus avoiding damage due to contact. The vertical part of the middle cover 10, which connects the lower level to the upper level, has a slit 10a through which the lens 9a of the fixed optical part 9 can see.

Figure 4:
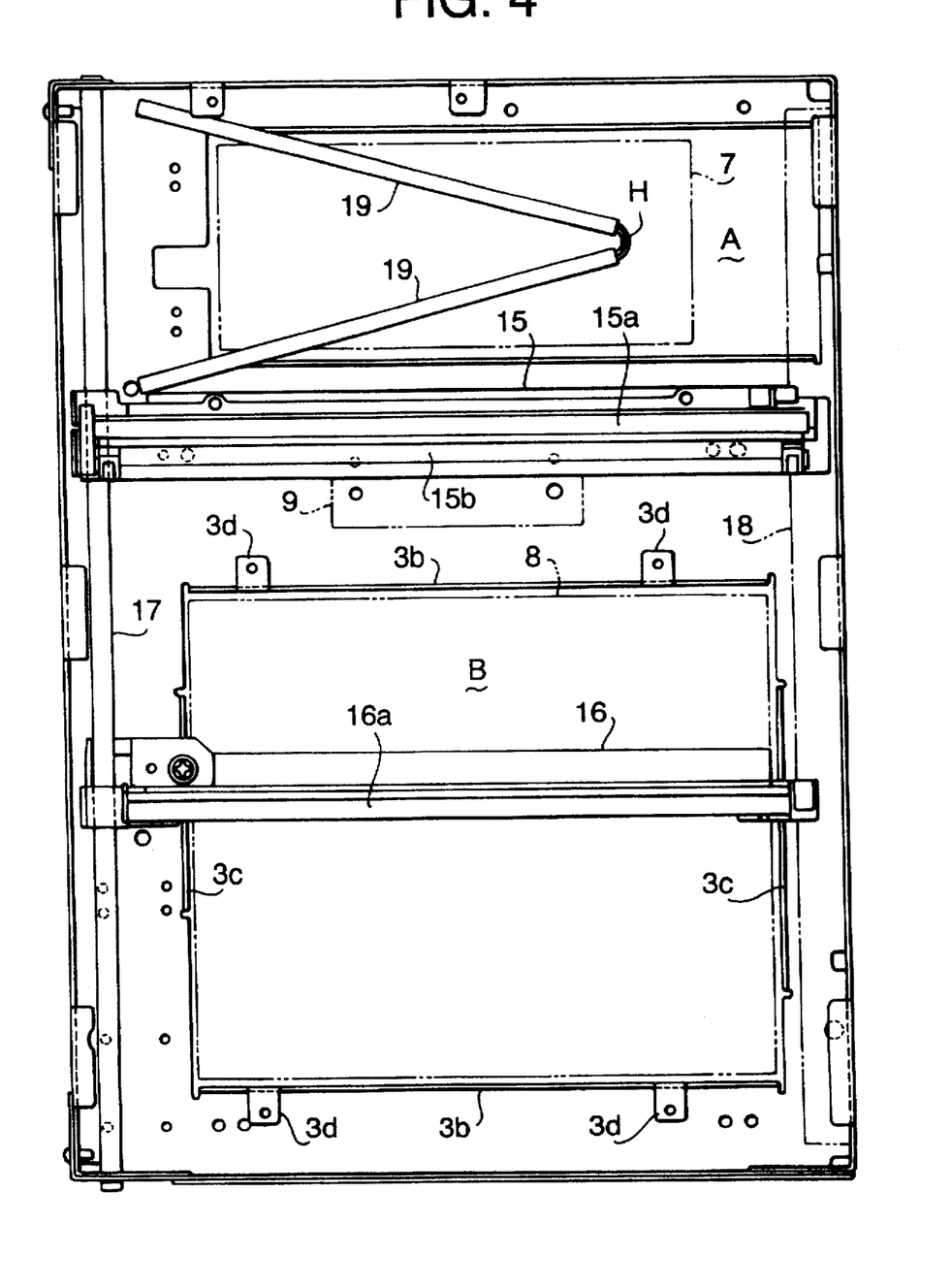
FIG. 4 is a plan view of the chassis when the optical scanning parts are in the scanning finish positions respectively.

The optical scanning parts are positioned above the middle cover 10 as shown in FIGS. 2 through 4. The optical scanning parts include a first scanning part 15 and a second scanning part 16 arranged in parallel to each other and spaced in the front and rear direction (FIG. 4). In order to illuminate the whole width of the platen glass 5, the first scanning part 15 includes a light source 15a having a plurality of LEDs or the like arranged in a line in the left and right direction (FIG. 4) and an associated first mirror 15b. The second scanning part 16 is provided with two mirrors (i.e., second and third mirrors) 16a, 16b above and below each other (FIG. 2). The first scanning part 15 is attached to the drive belt 13 wound around the larger pulleys and the second scanning part 16 is attached to the drive belt 14 wound around the smaller pulleys. The scanning parts 15,16 are transported forwards and backwards by driving the belts 13,14 respectively.

The first scanning part 15 is positioned nearer toward the fixed optical part 9 than the second scanning part 16 and its transportation speed is double that of the second scanning part 16 as it is fixed to drive belt 13. In relation to this, the path of the light beam will be described. As shown by the light beam L in FIG. 2, the light emitted from the light source 15a of the first scanning part 15 is reflected by the document G placed on the platen glass 5. The light directly reflected back is then reflected by the first mirror 15b horizontally towards the second scanning part 16, is in turn reflected downwards at the second mirror 16a, then horizontally at the third mirror 16b and arrives at the lens 9a of the fixed optical part 9 positioned facing the third mirror 16b. Accordingly, there is formed a light path including two horizontal paths at different heights.

As understood from the above description, the second scanning part 16 has upper and lower mirrors 16a,16b and these mirrors 16a,16b are used to reflect the upper horizontal light from the first mirror 15b of the first scanning part 15 into the lower horizontal light directed in the opposite direction. In order to maintain a fixed focus in the lens 9a, the traveling length of the light beam L from the first mirror 15b (strictly speaking, the light reflection position on the platen glass 5) to the lens 9a must always be fixed. For this end, when the distance between the third mirror 16b and lens 9a decreases, the distance between the second mirror 16a and first mirror 15a must increase by that amount. In the present invention, therefore, the first scanning part 15 is adapted to move twice the speed of the second scanning part 16.

It should be noted that the first scanning part 15 that directly projects the light onto the document G placed on the platen glass 5 is adapted to scan (or move) between the front and back edges of the platen glass 5 (between the left and right ends in FIG. 2). However, the second scanning part 16 needs only to scan as far as the center of the platen glass 5, i.e., a half way along the inside of the outer cover 1 or chassis 3 since the second scanning part 16 is a medium that reflects the light from the first scanning part 15 to the lens 9a and moves at a half speed of the first scanning part 15. Thus, as previously described, the middle cover 10 is formed into a two-level shape such that the lower level portion provides above itself a scanning space for the first scanning part 15, a scanning space for the second scanning part 16 and a traveling space for the light beam from the lower third mirror 16b to the lens 9a whereas the upper level portion needs only to provide a scanning space for the first scanning part 15 and a traveling space for the light beam from the upper first mirror 15b to the second mirror 16a. Due to this unique shape and arrangement of the middle cover 10, contact between the first and second scanning parts 15,16 and various elements below them is prevented while a compact device in the vertical direction can be realised.

The first and second scanning parts 15,16 which are driven in the above-described manner must be arranged so they slide while held in respective fixed attitudes. Due to this, a scanning guide shaft 17 spans the front and rear of the chassis 3 along the left side of the chassis 3 (FIG. 4). The guide shaft 17 extends in the space above the drive belts 13,14. The first and second scanning parts 15,16 respectively have through holes such that the guide shaft 17 passes through them.

As image distortion and noise are the result of the optical scanning parts sliding when not held in the fixed attitude, when the scanning parts 15,16 slide, the scanning guide shaft 17 must be fixed firmly so that it does not rotate or move in any direction. Conventionally, an E-ring is used for this purpose but this does not reliably prevent movement of the guide shaft 17. In the present invention, therefore, the ends of the guide shaft 17 are fixed to the chassis 3 by the construction as shown in FIGS. 7a, 7b and 8.

Figure 7A:
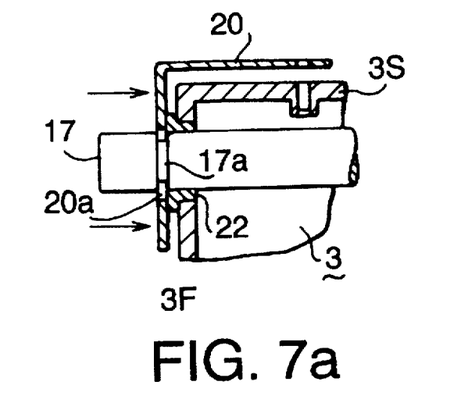
FIGS. 7a and 7b are partial plan sections showing a structure used to fix a scanning guide shaft to the chassis, with FIG. 7a showing the stage with a flat spring arranged on the corner of the chassis, and FIG. 7b showing the stage where a screw is threaded in and the scanning guide shaft is pushed by the flat spring.
Figure 7B:
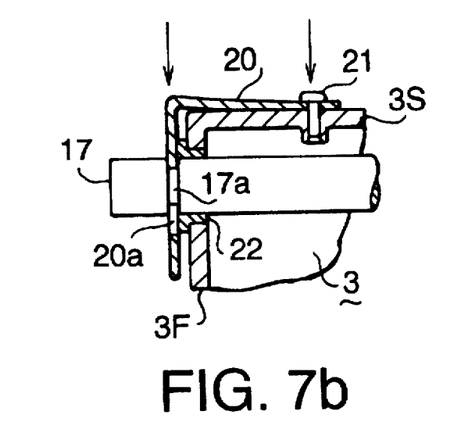
Figure 8:
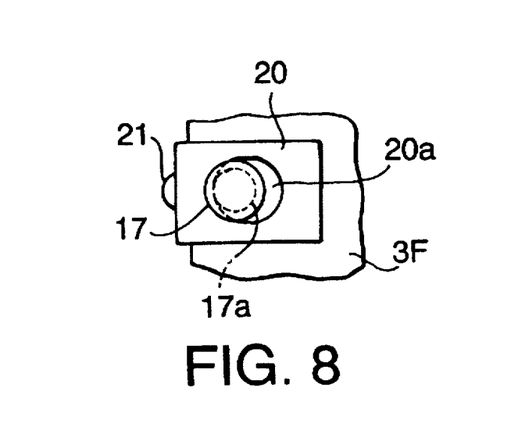
FIG. 8 is a partial front view of a projecting part of the scanning guide shaft in the state as in FIG. 7b.

Referring first to FIGS. 7a and 7b, a hole of larger diameter through which the scanning guide shaft 17 loosely passes is bored in the chassis 3. Movement in the radial direction of the scanning guide shaft 17 is prevented by a metal bearing 22 fitted in the hole of the chassis 3 and existing between the scanning guide shaft 17 and chassis 3. Furthermore, a circular groove 17a is formed in that part of the scanning guide shaft 17 which projects out from the outer edge of the metal bearing 22. This outer projecting part of the scanning guide shaft 17 is in the vicinity of the corner part of the front or rear surface of the chassis 3. A plate spring 20 bent into an L-shaped as viewed from above is provided around the corner of the chassis 3, with one leg thereof extending along the side surface 3S of the chassis 3 which is parallel to the scanning guide shaft 17 and the other leg extending along the front (or rear) surface 3F. A hole 20a for inserting the scanning guide shaft 17 is formed in that part of the flat spring 20 which corresponds to the bore for the bearing 22. When the L-shaped plate spring 20 is attached, it is first moved toward the guide shaft 17 as indicated by the arrows in FIG. 7a so that the guide shaft 17 extends through the hole 20a of the plate spring 20 until the plate spring 20 contacts the end face of the bearing 22 as illustrated in FIG. 7a. In this situation, there is some space between the side face 3S of the chassis 3 and the plate spring 20. Then, the part of the plate spring 20 that runs along the side surface 3S of the chassis 3 is tightened with a screw 21 such that the flat spring 20 is forced in the tightening direction as indicated by the arrows in FIG. 7b until the hole 20a of the flat spring 20 fits into the groove 17a of the scanning guide shaft 17 and firmly holds the guide shaft 17 as depicted in FIG. 7b. Since the flat spring 20 resiliently pushes the guide shaft 17 with a certain force in the diametrical direction of the guide shaft 17, the guide shaft 17 is fixed so that it cannot rotate. FIG. 8 is a front view of the guide shaft 17 and the plate spring 20 as in the state of FIG. 7b.

Another scanning guide shaft may also be arranged on the side opposite the scanning guide shaft 17 so that the first and second scanning parts 15,16 may slide in a fixed attitude more reliably. In this embodiment, however, in order to make the device more compact in width direction (the left and right direction), the second guide shaft is not arranged on the right side. Instead, a slide shelf 18 is formed along the right side of the chassis 3 and the right ends of the scanning parts 15,16 are positioned on the shelf 18 respectively as shown in FIGS. 3 and 4. The right ends of the scanning parts 15,16 slide on the shelf 18 when the scanning parts 15,16 are moved in the front and rear directions. When the scanning parts 15,16 are moved for scanning, the side fitted to the scanning guide shaft 17 (i.e., left side) runs slightly ahead of the opposite side and the scanning parts 15, 16 slide in a slightly angled attitude as seen from above. However, this is predicted by a designer of the optics and within tolerance. Since the scanning is carried out while the angled attitude is held, it presents no problem.

Among the optical scanning parts 15,16 that are capable of sliding, the first scanning part 15 is provided with the light source 15a as previously described and to control this light, a harness from the main control board 8 must be connected to the light source 15a. As the first scanning part 15 moves, each of the conductors of the harness must comprise flexible elements which are able to correspond to the movement of the first scanning part 15. If extended freely without any guides, however, the position of the harness is undetermined and the harness may interfere with the optical scanning parts. As this interference possibly affects the scanning attitude of the optical scanning parts, it needs to be prevented. Accordingly, it is required that the harness does not interfere with the scanning parts when the scanning parts move. Of course, the harness should be stored compactly.

For this purpose, as shown in FIGS. 3 and 4, the harness H is substantially confined in two tubes 19,19 above the middle cover 10. The lengths of the tubes 19,19 are approximately the same. In short, a cut in the tubes 19,19 is positioned in approximately the middle of the entire length of the harness H extending above the middle cover 10. A certain length of the harness H is exposed at the cut. By this arrangement, when the first scanning part 15 slides, for instance, when it moves as in the state from FIG. 3 to FIG. 4, the exposed part of the harness H between the tubes 19,19 bends and the tubes 22.23 fold as shown in FIG. 4. Consequently, the harness H does not interfere with the optical scanning parts and other components and moreover the harness itself is the minimum length to allow sliding of the first scanning part 15 and is therefore compact.

When the device of the present invention, i.e., the improved flat bed scanner, is used as a specialist scanning device for a facsimile, a modem is incorporated into the main control board 8 and this connects to the telephone lines. Then, the flat bed scanner of the invention is connected to the facsimile. The optical scanning part above the middle cover and comprising the first scanning part 15 and second scanning part 16 smoothly slides in the front and rear directions while held in a fixed attitude, scans up and down the document placed on the platen glass 5 and reflects the scanning beam to the lens 9a of the fixed optical part 9. CCD 9b converts this to an electronic signal and sends it to the main control board 8 which then converts it to another electronic signal which is suited for transmission to a remote terminal via the telephone lines or the facsimile connected to the flat bed scanner.

Due to the composition as described above, the present invention can demonstrate the following advantages. If the flat bed scanner according to the present invention is connected to a facsimile or the like as an accessory scanning device, it can scan books, catalogs and other thick documents as placed on the platen glass of the flat bed scanner without copying of each page of the thick material (i.e., a separate copy machine is not required near the facsimile), can also transfer the scanned data to a printer of the facsimile so that the printer can print it and can further transmit the scanned data to a desired third party terminal via telephone lines by a key operation of the facsimile or an associated telephone.

Further, while having a compact structure, the possible problematic interference between the optical scanning parts and other components inside the flat bed scanner is avoided by the arrangement of the middle cover 10. In short, while ensuring appropriate scanning by the optical scanning parts, a device of suitable compact size can be realised as a specialist scanning device attached to a facsimile, a personal computer, etc.

In addition, as the angular or rough corner portions formed by a pressing process using a sheet material are protected by the corner members, the outer cover can be constructed by punch pressing. Thus, the processing is simple: it does not resort deep drawing and this contributes to a suitable price for a compact scanning device.

Moreover, the interference of the harness connected to the light source provided on the scanning part of the optics with the optical scanning parts moving during the scanning operation can be avoided. Also, the harness is compact in size contributing to the accuracy of the scanning by the optical scanning parts and the compactness of the device.

What is claimed is:

1. A flat bed scanner comprising:

a main control board;

a fixed optical unit;

a power source;

a harness for connecting the power source to the main control board;

means for housing the main control board, fixed optical unit and power source, the housing means having an open top;

a middle cover provided in the housing means and extending over the main control board, fixed optical unit and power source;

optical scanning means positioned inside the housing means above the middle cover; and a scanning glass extending over the optical scanning means and closing the top of the housing means for scanning a material loaded on the scanning glass; and two spaced rigid tubular segments housing the harness so that a portion of the harness is exposed between the two tubular segments and the two tubular segments can bend at the exposed portion of the harness.

2. The flat bed scanner as in claim 1, wherein the housing means has a box shape having a plurality of corners and is constructed from a sheet material by a pressing/folding process, and a plastic corner member is attached to each corner of the box-shaped housing means.

3. The flat bed scanner as in claim 1 further including connection means for coupling to a facsimile, or a personal computer.

4. A flat bed scanner comprising:

a main control board;

a fixed optical unit;

a power source;

a harness for connecting the power source to the main control board;

means for housing the main control board, fixed optical unit and power source, the housing means having an open top;

a middle cover provided in the housing means and extending over the main control board, fixed optical unit and power source;

optical scanning means positioned inside the housing means above the middle cover; and a scanning glass extending over the optical scanning means and closing the top of the housing means for scanning a material loaded on the scanning glass; wherein the optical scanning means includes first and second scanning parts, the middle cover has a stepwise shape defining an upper level and a lower level, said upper and lower levels lying in parallel planes and the first scanning part is adapted to move on the upper level and above the lower level and the second scanning part is adapted to move on the lower level.

5. The flat bed scanner as in claim 4, wherein the first scanning part is moved twice the speed of the second scanning part.

6. A flat bed scanner comprising:

a main control board;

a fixed optical unit;

a power source;

a harness for connecting the power source to the main control board;

means for housing the main control board, fixed optical unit and power source, the housing means having an open top;

a middle cover provided in the housing means and extending over the main control board, fixed optical unit and power source;

optical scanning means positioned inside the housing means above the middle cover; and a scanning glass extending over the optical scanning means and closing the top of the housing means for scanning a material loaded on the scanning glass; and a chassis removably placed on the bottom of the housing means and having an opening to expose a certain portion of the bottom of the housing means, and the power source and main control board are located in the opening so that they directly stand on the bottom of the housing means whereas the fixed optical unit and other components are directly located on the chassis.

7. The flat bed scanner as in claim 6, wherein a projection is formed along the periphery of the opening to shield an electric wave generated by the main control board.

* * * * *